United States Patent [19]

Dakin et al.

[11] Patent Number: 4,888,480

[45] Date of Patent: Dec. 19, 1989

[54] OPTICAL SENSING ARRANGEMENTS WITH WAVELENGTH AND TIME-DISPLACEMENT DETECTION

[75] Inventors: John P. Dakin, Hampshire; David J. Pratt, Suffolk, both of Great Britain

[73] Assignee: Plessey Overseas Limited, Ilford, England

[21] Appl. No.: 131,167

[22] Filed: Dec. 10, 1987

[30] Foreign Application Priority Data

Dec. 10, 1986 [GB] United Kingdom ............... 8629478

[51] Int. Cl.⁴ .................................................. G01J 3/50
[52] U.S. Cl. ..................................... 250/226; 250/227
[58] Field of Search .................... 250/227, 231 R, 226

[56] References Cited

U.S. PATENT DOCUMENTS 4,356,396 10/1982 Ruell et al. ......................... 250/227
4,477,725 10/1984 Asawa et al. ................... 250/231 R
4,523,092 6/1985 Nelson ............................... 250/227
4,703,175 10/1987 Salour et al. ..................... 250/231 R Primary Examiner—David C. Nelms
Attorney, Agent, or Firm—Fleit, Jacobson, Cohn, Price, Holman & Stern

[57] ABSTRACT

A two-wavelength referencing optical sensing arrangement comprises two laser sources for producing simultaneous optical pulse signals of two different wavelengths for transmission over a plurality of discrete optical fibre paths to the sensors terminating such paths. Time-displaced return signals of different wavelengths received over the optical paths from sensors are fed into a single receiver which uses the intensity of signals of one wavelength in order to compensate for unknown losses in the system when indicating measurement of conditions sensed at the locations of the optical sensors.

3 Claims, 1 Drawing Sheet

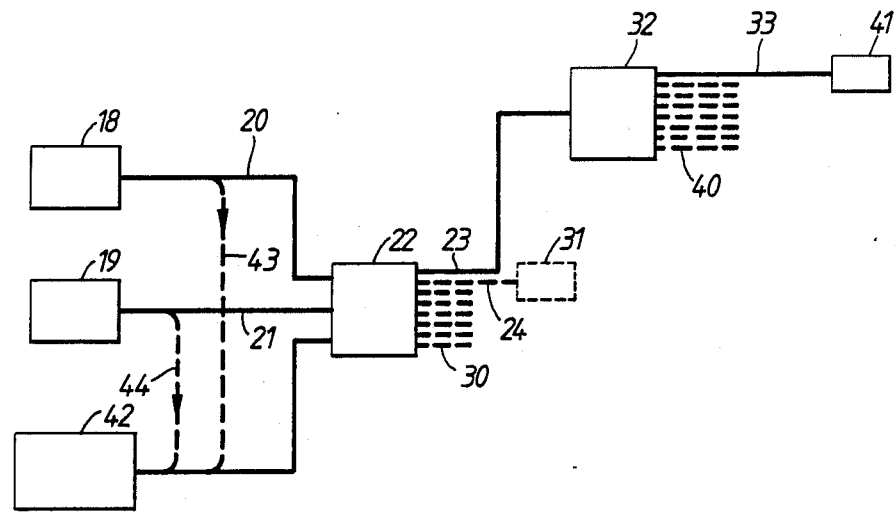

OPTICAL SENSING ARRANGEMENTS WITH WAVELENGTH AND TIME-DISPLACEMENT DETECTION

This application is related to and owned in common with copending application Serial Nos. 131,166 and 131,168 filed Dec. 10, 1987.

BACKGROUND OF THE INVENTION

This invention relates to optical sensing arrangements. More specifically, the invention relates to optical sensing arrangements in which optical signals are transmitted along a plurality of discrete optical fibre paths of different lengths which are terminated by respective sensors adapted for sensing temperature, pressure or any other condition to be sensed at appropriate locations and in which optical signals reflected or otherwise caused to be transmitted back along the optical fibres of different lengths in response to the transmission of optical signals along said fibres and in accordance with variations in conditions at the aforesaid locations are detected by optical time domain or frequency domain reflectometer means for determining the conditions at the sensor locations.

SUMMARY OF THE INVENTION

The present invention is directed to a two-wavelength referencing arrangement of the form described above in which two laser sources are employed to produce simultaneous optical pulse signals of two different wavelengths for transmission over the plurality of discrete optical fibre paths to the sensors terminating such paths and in which the time-displaced return signals of different wavelenghs received over the optical paths from the appertaining sensors are fed into a single receiver which uses the intensity of signals of one wavelength as a reference basic for the intensity signals at the other wavelength in order to compensate for unknown losses in the system when providing an indication of the measurand (s) at the locations of the optical sensors. The use of a single receiver instead of the usual two receivers to monitor simultaneously the reflectivity of the sensors at two different wavelengths enables significant cost savings to be achieved since these receivers which may be low-noise receivers embody avalanche photodiodes and relatively-expensive signal detection and averaging means to provide the requisite low-noise and good time-distance resolution in the measurand.

The optical sensing system according to the presen invention may also include an arrangement in which reference signals indicative of the levels of the pulse outputs at different wavelengths from the laser sources are fed to the signal receiver in order to provide continuous calibration of the receiver so as to compensate for changes in intensity of the laser outputs which could give rise to inaccuracies in the measurements provides by the receiver.

BRIEF DESCRIPTION OF DRAWING FIGURE

By way of example, one embodiment of the present invention will now be described with reference to the accompanying single-figure drawing which shows aa two-wavelength referencing multiplexed optical sensing system.

DETAILED DESCRIPTION OF PREFERRED EMBODIMENT

Referring to the drawing, the system illustrated comprises two lasers 18 and 19 which provide simultaneous pulse output signals of different wavelengths. These pulse signals are launched into two optical fibres 20 and 21 which convey the signals to a coupler 22 within which such signals of the two differen wavelengths are combined. Theh coupler 22 also divides the combined pulse signals equally between eight optical fibres 23 to 30 as shown. These optical fibres are of different lengths and may be directly terminated by optical sensors, such as the fibre 24 terminated by sensor 31, for sensing temperature pressure or other conditions at different locations or they may be terminated by a further coupler, such as the coupler 32 which terminates the optical fibre 23. The furher coupler 32 may then divide the combined incoming signal at the two different wavelengths equally between eight further optical fibres 33 to 40 which will be of different lengths and terminated by optical sensors, such as the sensor 41.

As will be appreciated, in operation of the system illustrated, the light signals returning down the optical fibres from the sensors will be time-displaced relative to one another due to the variable delays provided by the optical fibres, such as the fibres 33 to 40 of different lengths.

The time-displaced return signals of the two different wavelengths are combined by the action of the couplers 32 and 22 as hereinbefore described and fed into a low-noise singlel receiver 42 which uses the level of returned signals at one wavelength in order to correctively determine the level of the returned signals at the other wavelength. The performance of such wavelength signal level determination funcion by a receiver is per se already well known in the art and involves signal separation and detection by wavelength filters and detectors. Since both separated wavelengh signals are subject to essentially the same losses in the system, the two-wavelength reference technique compensates for any such losses.

Moreover, the receiver 42 also receives small reference signals from the laser sources 8 and 19 over feedback paths 43 and 44 as shown. These reference signals serve to calibrate the receiver 42 continuously in a generally well known manner in dependence upon changes in the relative intensities of the laser output signals at the different wavelengths.

Optical fibre delay loops (not shown) may also be introduced into the measuremen or feedback paths 43 and 44 in order to time displace these reference signals from signals reflected back to he receiver from the couplers/sensors.

The optical sensors may take many different forms.

We claim:

1. An optical sensing arrangement comprising two laser light sources for producing simultaneous optical pulse signals of two different wavelengths, in which these optical pulse signals are combined by optical coupler means and transmitted over a plurality of discrete optical fibre paths of different lengths terminated by respective sensors for sensing certain parameters at predetermined locations, and in which time-displaced return signals at different wavelengths received over the optical fibre paths from the respective sensors are fed to a single receiver, said receiver including means utilizing the intensity of signals of one of said two wavelengths as a reference basis for correctively determining intensity of signals at the other of said two wavelengths in order to compensate for unknown losses when providing an indication of measurand(s) at the location of the optical sensors.

2. An optical using arrangement as claimed in claim 1, in which reference signals indicative of the levels of the pulse outputs at different wavelengths from the laser sources are fed to the single receiver in order to provide continuous calibration of the receiver so as to compensate for changes in intensity of the laser outputs which could give rise to inaccuracies in the measurements provided by the receiver.

3. An optical sensing arrangement as claimed in claim 2, in which the paths over which the reference signals are transmitted to the single receiver include delay loops.

* * * * *